United States Patent Office 2,773,878
Patented Dec. 11, 1956

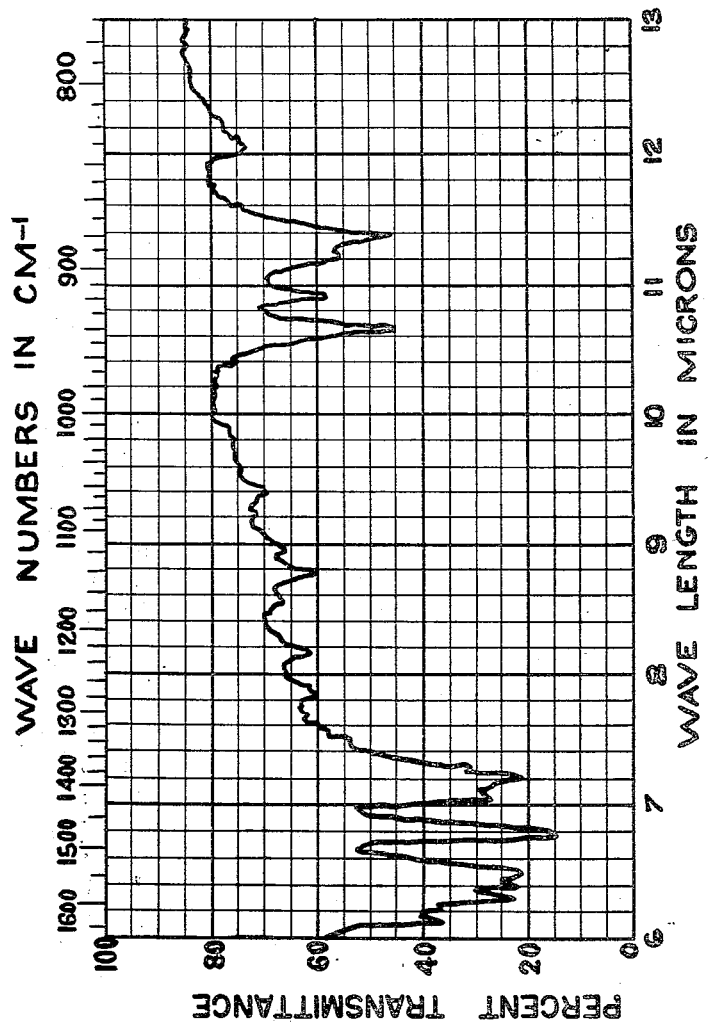
INVENTORS
GILBERT M. SHULL
JOHN B. ROUTIEN
ALEXANDER C. FINLAY

2,773,878

CYCLOSERINE AND PRODUCTION THEREOF

Gilbert M. Shull, Roslyn Heights, N. Y., John B. Routien, Tenafly, N. J., and Alexander C. Finlay, Flushing, N. Y., assignors to Chas. Pfizer & Co., Inc., Brooklyn, N. Y., a corporation of Delaware Application March 5, 1952, Serial No. 274,924

5 Claims. (Cl. 260—307)

This invention is concerned with a new and useful antibiotic called cycloserine. It is also concerned with the production of this antibiotic, particularly by fermentation, and its recovery and concentration from crude solutions, including fermentation broths. The invention embraces cycloserine in dilute solutions, as crude concentrates, and in purified form.

This new antibiotic is formed during the cultivation under controlled conditions of a novel strain of the known species of microorganism, Streptomyces lavendulae. This strain which we have isolated from soil, and which we designate as culture number 8197-20, appears to be very similar in cultural characteristics to a strain of *S. lavendulae* obtained from Dr. Selman Waksman, with minor exceptions. A culture of the living microorganism has been deposited with and is available from the American Type Culture Collection; it has been designated as ATCC 11924.

The new strain was planted on two occasions onto the standard media used for identification of actinomycetes. At the same time a culture sent to us by Dr. Waksman as *S. lavendulae*, and which has been given our number F. D. 1073, was planted on the same lots of media. Listed below are the cultural characteristics of these two strains as well as the descriptive phrases ascribed to the species by Waksman and Henrici in Bergey's Manual of Determinative Bacteriology, edition 6, 1948, p. 944. Readings are based on a total of nine tubes or Petri dishes of each medium for each culture. (The colors, where R is written, are those of Robert Ridgway, Color Standards and Nomenclature, 1912.) Our culture is so similar to Dr. Waksman's strain that we consider it to belong to the same species, *S. lavendulae*.

| Medium | Culture | | |
|---|---|---|---|
| | Our strain 8197-20 | Waksman's strain, our F. D. 1073 | Waksman's and Henrici's description [1] |
| Glucose-asparagine agar plates. | Growth—poor to good. Spores—good sporulation, near pale vinaceous drab (R). Soluble. Pigment—None. Remarks—Colony flat to slightly elevated, surface smooth to slightly wrinkled; edge smooth; reverse creamy color. Spores in chairs, chains mostly straight or slightly curved; very few loose spirals. Spores short-cylindrical, 0.65-1.0 x 1.0-2.0μ. | Poor to good. Sporulation poor to good, near pale vinaceous drab (R). None. Colony flat to slightly elevated, surface slightly wrinkled; edge smooth; reverse creamy to light brown. Spores in mostly straight or slightly curved chairs; very few rather loose spirals; spores short-cylindrical, 0.65-1 x 1.3-2.0μ. | Spirals close. Conidia oval, 1.0 to 1.2 by 1.6 to 2.0 microns. |
| Gelatin plates. | Growth—Moderate at 18°C. Spores—None; colony waxy and light brown to near olive bluff (R). Soluble. Pigment—Dark brown. Remarks—Moderate to good liquefaction. | Moderate to good. None, colony waxy, brown to tan. Dark brown. Very poor liquefaction. | Creamy to brownish surface growth. Liquefied. |
| Glucose agar. | Growth—Moderate. Spores—Mostly none, colony waxy, pale tan; occasional white aerial mycelium. Soluble. Pigment—Medium to dark brown. | Moderate to good. None; colony waxy, creamy to light brownish. Medium to dark brown. | |
| Calcium malate. | Growth—Poor, thin. Spores—Sporulation moderate, white aerial mycelium with pale brownish pink to pale vinaceous drab (R) spores. Soluble. Pigment—None. Remarks—Reverse white. | Poor, thin. From none to slight sporulation of smoke gray (R) to pale pink color. None. Reverse white. | |
| Starch plates. | Growth—Poor. Spores—Poor to good sporulation, white to pale gray spores. Soluble. Pigment—None. Remarks—Reverse white; almost no hydrolysis. | Poor. Poor sporulation from pale pinkish brown to near smoke gray (R). None. Reverse white; almost no hydrolisis. | Restricted, glistening, transparent growth. Hydrolyzed. |
| Synthetic agar. | Growth—Poor, thin. Spores—Sporulation good, near pale vinaceous fawn to vinaceous buff (R). Soluble. Pigment—None. Remarks—Reverse white. | Poor, thin. Sporulation poor to good, very pale pink to near avellaneous (R). None. Reverse white. | Thin, spreading colorless growth. Aerial mycelium cottony, white becoming vinous-lavender. |
| Cellulose strips. | Growth—None. | None. | |
| Skimmed milk. | Growth—Moderate. Spores—Brownish ring in tube. Soluble. Pigment—Light grayish brown to dark brown. Remarks—No coagulation; very slight peptonization of milk. | Moderate. Cream colored to brownish ring in tube. Light to fairly dark brown. No coagulation; very slight peptonization. | (On litmus milk.) Cream colored ring. No coagulation. Peptonized, with strong alkaline reaction. |

See footnote at end of table

| Medium | Culture | | |
|---|---|---|---|
| | Our strain 8197-20 | Waksman's strain, our F. D. 1073 | Waksman's and Henrici's description [1] |
| Dextrose nitrate broth | No reduction | No reduction | Nitrites produced. |
| | Soluble | | |
| | Pigment—Light brown | Light to medium brown | |
| | Remarks—Reverse light brown | Reverse light brown | |
| Nutrient agar | Growth—Moderate | Poor to moderate | |
| | Spores—Very few; colony surface white | None; colony waxy, creamy to grayish brown. | |
| | Soluble | | |
| | Pigment—Light brown | Light to medium brown | Thin, wrinkled. |
| | Remarks—Creamy to light tan | Reverse light brown | Cream colored to yellowish growth. |
| Potato plugs | Growth—Good | Moderate to good | |
| | Spores—Sporulation moderate to good; light vinaceous fawn to pallid vinaceous drab to avellaneous and light cinnamon drab (R), with some waxy areas. | From very slight pallid mouse gray (R) with most of colony waxy to good sporulation of pallid mouse gray to mouse gray (R) color. | |
| Emerson's agar | Growth—Good | Good | |
| | Spores—Good sporulation, near light cinnamon drab to avellaneous (R). | Moderate to good sporulation, near light cinnamon drab to vinaceous buff (R). | |
| | Soluble | | |
| | Pigment—Light to medium brown | Light to medium brown | |
| | Remarks—Reverse light to medium brown. | Reverse light to medium brown | |
| | | | Soluble brown pigment formed (media not designated). |

[1] In Bergey's Manual.

Heretofore strains of S. lavendulae have been reported to produce two different antibiotics, lavendulin (Kelner et al., J. Bact., vol. 51, p. 591 (1946)) and streptothricin (Waksman et al., Soil Science, vol. 54, p. 281–296 (1942)). Cycloserine is wholly distinct from either of these, as well as from other known antibiotics. The notably low toxicity of cycloserine makes it of special value therapeutically, in contrast to lavendulin and streptothricin which have particularly high toxicities.

It is to be understood that for the production of cycloserine we do not wish to limit ourselves to the particular isolate here described, as variations may occur in the cultural characteristics of this strain without affecting production of the antibiotic. We especially wish to include in the term "strain No. ATCC 11924" organisms which are mutants obtained by mutating agents such as X-radiation, ultraviolet radiation, nitrogen mustards and so forth.

Cycloserine shows considerable activity against a number of different gram-negative and gram-positive microorganisms, and notably against the mycobacteria. It is effective in human therapy for bacterial infections and tuberculosis. With certain other microorganisms, such as Monilia albicans and Trichophyton gypseum, its activity has not yet been proven in therapy. It has unusually low toxicity as an advantageous accompaniment to its generally high activity. For instance, 100 mg. of the crude preparation described in the table below may be injected intravenously into 20-gram mice without causing death. More highly purified cycloserine is naturally even more effective in therapy and even lower in toxicity.

When 25 milligrams of the crystalline antibiotic, in aqueous solution, are injected intravenously in a mouse, it does not cause death. However, if the dosage is raised to 50 milligrams, some deaths are encountered.

The potency of cycloserine may be measured in several different ways. The zone of inhibition formed upon adding a given sample to an agar plate seeded with a standard culture of Bacillus subtilis is one measure of its activity. We have found that this method is quite dependent upon the pH of the test solution of cycloserine, the highest activity being obtained at a pH of about 2. A second method for testing the new antibiotic, not sensitive to pH changes, is by measuring the extent of turbidity in standard liquid cultures of Staphylococcus aureus to which various amounts of the given sample have been added. (See McMahon, J. Biol. Chem., vol. 153, p. 249–258, (1949).) A third test utilizes a standard culture of E. coli, and this method forms the present preferred basis for assigning potencies to the various preparations of cycloserine. These potencies are defined in terms of E. coli dilution units (C. D. U.) per milligram. By this we mean the maximum volume of nutrient broth in milliliters to which one milligram of the antibiotic preparation (which may be of varying degrees of purity) may be diluted and, when inoculated with a $10^{-6}$ dilution of an 18-hour culture of E. coli grown under standard conditions, still show no bacterial growth at the end of 18 hours' incubation at 37° C.

The following table shows the antibiotic spectrum of a crude preparation of the new composition against a number of different microorganisms. The sample tested had a potency of 200 C. D. U./mg. Purer samples demonstrate higher activity. The figures in the table indicate the concentrations in micrograms of the cycloserine preparation required per milliliter of nutrient agar, to prevent bacterial growth on the agar; the symbol + indicates growth, and —, no growth.

| Microorganism | Concentration | | | | |
|---|---|---|---|---|---|
| | 500 | 100 | 50 | 10 | 1 |
| A. aerogenes [1] | — | + | + | + | + |
| Do [2] | — | + | + | + | + |
| Do | — | + | + | + | + |
| E. coli | — | — | — | + | + |
| Proteus sp | — | — | + | + | + |
| Pseudomonas sp | — | + | + | + | + |
| M. albicans | + | + | + | + | + |
| S. typhosa | — | — | — | + | + |
| K. pneumoniae | — | + | + | + | + |
| S. paratyphi A | — | — | — | + | + |
| S. paratyphi B | — | — | — | + | + |
| Staph. aureus | — | — | — | + | + |
| B. subtilis | — | — | — | + | + |
| St. fecalis | — | — | — | + | + |
| Brucella sp | — | — | — | + | + |
| Trichophyton gypseum | + | + | + | + | + |
| Myco. ranae | — | — | — | + | + |
| Myco. phlei | — | — | — | + | + |
| Myco. 607 | — | — | — | + | + |
| Myco. smegmatis | — | — | — | + | + |

[1] Aureomycin-resistant strain.
[2] Streptomycin-resistant strain.

When a sample of crystalline cycloserine is used to determine the activity against these microorganisms, the following results are obtained. This material has a potency of about 1300 units per milligram.

| Microorganism | Concentration | | | | | |
|---|---|---|---|---|---|---|
| | 200 | 100 | 50 | 20 | 10 | 5 |
| A. aerogenes [1] | − | + | + | + | + | + |
| Do. [2] | − | + | + | + | + | + |
| Do. | − | − | ± | + | + | + |
| E. coli | − | − | − | ± | + | + |
| Proteus sp | − | − | + | + | + | + |
| Pseudomonas sp | − | + | + | + | + | + |
| M. albicans | + | + | + | + | + | + |
| S. typhosa | − | − | − | ± | + | + |
| K. pneumoniae | + | + | + | + | + | + |
| S. paratyphi A | − | − | − | − | ± | + |
| S. paratyphi B | − | − | − | − | + | + |
| Staph. aureus | − | − | − | − | + | + |
| B. subtilis | − | − | − | − | + | + |
| St. fecalis | − | − | − | + | + | + |
| Brucella sp | − | − | − | − | − | + |
| Trichophyton gypseum | + | + | + | + | + | + |
| Myco. ranae | − | ± | + | + | + | + |
| Myco. phlei | − | − | − | − | − | − |
| Myco. 607 | − | + | + | + | + | + |
| Myco. smegmatis | − | − | − | − | − | + |

[1] Aureomycin-resistant strain.
[2] Streptomycin-resistant strain.

Cycloserine has been compared to other antibiotics and found to be a distinctly different compound. For instance, the new antibiotic, when tested by paper chromatography with various known materials using several solvent systems, formed distinct, compact zones on sheets of filter paper.

This invention embraces a process for producing cycloserine by cultivating the new strain No. ATCC 11924 of the microorganism *Streptomyces lavendulae* in an aqueous, nutrient-containing solution under aerobic conditions until substantial antibiotic activity has been imparted to the solution. Such cultivation is conducted preferably at a temperature of from about 25° to about 30° C. and under submerged conditions of agitation and aeration, for a period generally of from about two to four days. Nutrient materials that may be used include an organic nitrogen source, such as soybean meal, cottonseed meal, alfalfa meal, hydrolyzates of casein and other proteins, etc.; a source of growth substance, such as distillers' solubles, yeast extract, or a commercially available vitamin concentrate (BY-500); mineral salts like sodium chloride and potassium phosphate, but especially sodium nitrate; a buffering agent like calcium carbonate; and an oil to help prevent foaming, e. g. soybean oil, lard oil, a silicone or other suitable material. Particularly beneficial as nutrients are carbohydrate sources, such as sugars, starch, glycerine and the like. After growth has been completed, the mycelium is separated from the broth now containing the antibiotic, and cycloserine is desirably recovered from the broth by suitable means which will be described below.

Inoculum for this fermentation may be obtained by employing a growth from slants or Roux bottles inoculated with our strain of *S. lavendulae*. Solid media for the initial growth are commonly beef lactose and Emerson's agar, and this growth is used to inoculate either shaken flasks or submerged inoculum tanks. Alternatively, the inoculum tanks are seeded from the shaken flasks. The time required for optimum elaboration of cycloserine is generally at least about two days but not more than about five days. When the material is produced by growth in shaken flasks, the time is generally longer than in stirred, aerated tanks. At all times aeration is maintained in the tanks by blowing sterile air through a sparger at the rate of ½ to 2 volumes of free air per volume of broth per minute. Certain antifoaming agents, such as vegetable or animal oils or a silicone, help to prevent excessive foaming. The broth is agitated at a speed depending upon the particular type of agitator used in the tank, and completely aseptic conditions are maintained throughout the growth.

The crude broth obtained after filtration of the mycelium from the new strain of *S. lavendulae* has utility in itself. However, we prefer to purify the cycloserine at least partially before using it therapeutically. Purification may be brought about by certain particularly efficient techniques. Thus, the antibiotic may be adsorbed from solution on strongly acidic cation-exchange resins, especially those containing sulfonic acid groups as the active adsorbing radicals. Of particular utility are the resins known in the trade as "Amberlites," notably "Amberlite IR 120." Adsorption is best conducted with these at from about pH 3.0 to about pH 7.0, the higher range being more favorable. Other strongly acidic ion-exchange resins, such as "Amberlite IR 100" or "Amberline IR 1," may be used, but their capacity is less than that of "Amberlite IR 120." Other sulfonic acid type resins, such as "Amberlite IR 105," "Permutit Q," "Ionac C–200," or "Dowex 30" or "Dowex 50" are also valuable. These materials are generally phenol-formaldehyde resins containing sulfonic acid groups introduced by adding a sulfite during formation of the resin; or they are sulfonated hydrocarbon polymers or polymers prepared from sulfonated phenols and formaldehyde.

The adsorbate of cycloserine on such ion-exchange resins has utility of itself, e. g. it may be used as a source of the antibiotic in animal nutrition or in treating specific diseases of animals or human beings. Nevertheless, we prefer to elute the antibiotic from the resin and use a purified concentrate obtained therefrom. This may be still further purified, as described in detail below. For elution of the antibiotic from the resin, it has been found that dilute alkaline solutions are particularly useful. For instance, ammonium hydroxide at a concentration of about 0.5 to about 3% by weight in water is quite useful for displacing the antibiotic from the resin. This may be done in a fractional manner so that a product of particularly high activity is obtained. After adsorption of the antibiotic on the resin, the resin may be washed with a small volume of water to remove residual inactive material, and the dilute basic solution, in particular ammonium hydroxide, may then be slowly run through the resin. Although we find it quite useful to employ the resin in a column or tube, adsorption and elution may be carried out alternatively in batchwise fashion. Other bases, such as sodium or potassium hydroxide or strong organic bases, can readily be substituted for the ammonium compound.

When fractionally eluting cycloserine from resin adsorbate, the first eluate from the resin bed has a strongly acidic reaction. As more and more of the dilute base is passed through the column of pH of the effluent gradually rises. Small amounts of active material are obtained in the first effluent, but not until the pH reaches about 6 is the major portion of the antibiotic recovered. At a pH of from about 6 to 6.5 much of the cycloserine is removed. However, the optimum pH may vary considerably with the batch of antibiotic used. In some cases a pH of as high as 10 is required to remove most of the antibiotic. The highly active fraction of effluent may be separated from the forerun and afterrun to yield a dried product of particularly high purity. Material obtained by preliminary purification of the broth with activated carbon at a basic pH and then at an acidic pH (as hereinafter discussed), followed by adsorption on "Amberlite IR 120" and fractional elution with ammonium hydroxide, will yield a solid product having a cycloserine potency of about 200 C. D. U./mg. or greater. Such product may contain 10% or less of ash, which can be almost completely removed by passing a solution of this product over a column of a strongly basic type anion-exchange resin. Some loss of potency is encountered in such a purification, however, and a preferred method is chromatography on columns of alumina, silica gel or other suitable metallic oxide. Thus, if a concentrated solution of the antibiotic in water or in water containing methanol is passed over a column of activated alumina, the antibiotic is adsorbed thereon. By passing aqueous methanol over such a column, it is possible to obtain fractions with higher activity.

We have found that cycloserine is not adsorbed readily on activated carbon at either an alkaline or an acid pH. This peculiar property of the antibiotic we use to advantage by selectively adsorbing a variety of impurities with carbon from the fermentation broth or from partially purified concentrates. For instance, filtered cycloserine broth may be made basic and many impurities removed by activated carbon, such as Norit A or Nuchar. The solution obtained after removal of this carbon may be made acid and other impurities adsorbed by a second carbon treatment. When these two steps are carried out, little of the antibiotic is removed but a practically colorless solution is obtained. Such solution may be simply dried, or the antibiotic may be adsorbed therefrom on the aforementioned "Amberlite IR 120" or other suitable strongly acidic resin for further purification. Rather than employing the carbon treatment before the adsorption with ion-exchange resin, the carbon may be used after elution of the antibiotic from the resin adsorbate.

Various purification steps may be combined in order to obtain highly purified cycloserine and, in fact, the compound may be obtained in crystalline form by such procedures. For instance, fermentation broth may be filtered at an acidic pH and treated with activated carbon to remove certain impurities. The antibiotic may then be adsorbed from the acid solution on a strongly acidic ion-exchange resin, such as "Amberlite IR 120." Elution is accomplished as described above with dilute ammonium hydroxide. The fractions containing the most highly potent material are collected and dried, preferably from the frozen state under vacuum. The dry material may then be extracted with methanol and the filtered extract may be treated with an excess of acetone to precipitate certain impurities. On concentration of the filtrate, impurities separate. When a small volume is reached, the crystalline antibiotic finally separates. It may be recrystallized from hot methanol, using carbon and a filteraid, particularly such materials as Super Filtrol, to remove such impurities. On cooling, the crystalline antibiotic gradually separates. An alternative method for crystallizing or recrystallizing the antibiotic is to dissolve the purified material in a minimum amount of water and then add ethanol. It should be pointed out that prolonged heating of cycloserine, either in solvents or water, tends to inactivate the material. Therefore, in purification procedures, the length of time during which solutions of the antibiotic are heated should be kept to a minimum.

A distinct and unusual property of this new antibiotic cycloserine is its non-extractability from fermentation broth either at acid, neutral or alkaline pHs with a variety of conventional organic solvents including butanol, methylisobutyl ketone, ether, ethylacetate, chloroform and benzene. It will be noted that these solvents represent many different types of organic compounds: alcohols, ketones, ethers, esters, chlorinated hydrocarbons and aromatic hydrocarbons. However, surprisingly enough, the addition of a strong organic acid like paratoluenesulfonic acid to cycloserine solutions implements extraction of the antibiotic into a water-immiscible alcohol-type solvent, such as butanol or benzyl alcohol. Other strong organic acids may naturally be used in place of the para-toluenesulfonic acid.

The various properties described above serve to distinguish cycloserine from other antibiotics. In addition, the new substance appears to be an amphoteric compound containing weakly basic and weakly acidic groups. It has a molecular weight of about 102. It shows considerable stability both to heat and pH changes when dissolved in water. Various crude preparations of the antibiotic give strongly positive ferric chloride tests. Concentrates show little absorption in the ultraviolet range of the spectrum. Cycloserine itself, however, has a characteristic ultraviolet absorption at a wave length of 225 microns.

Samples of the crystalline cycloserine have been analyzed. The following is the elemental analysis of cycloserine calculated from the empirical formula $C_3H_6N_2O_6$:

| | Percent |
|---|---|
| Carbon | 35.3 |
| Hydrogen | 5.9 |
| Nitrogen | 27.4 |
| Oxygen (by difference) | 31.4 |

It has been found that analyses of the nitrogen content of this compound are particularly difficult and, unless care is exercised, low values are encountered. The optical rotation of the crystalline cycloserine, when dissolved in 90% methanol, is $[\alpha]_D^{25}=+53.7°$. The crystalline compound is slightly soluble in butanol and acetone, somewhat more soluble in methanol, very slightly soluble or insoluble in most other organic solvents, e. g. benzene, chloroform and ether, but very highly soluble in water. It should be noted that the presence of impurities tends to raise the solubility of the antibiotic appreciably. The crystalline antibiotic has an apparent melting point of 155°–156° C.

The infrared absorption spectrum of the crystalline compound was determined on a mineral oil mull. Among the characteristic frequencies are the following (in reciprocal centimeters): 1626, 1602, 1580, 1557, 1534, 1408, 1402, 1266, 1227, 1168, 1141, 1117, 1064, 938, 916, 892, 880, and 830. The infrared absorption spectrum is shown in Figure I.

The following examples are given as illustrations of the manner in which cycloserine may be formed, recovered, concentrated, purified and obtained in therapeutically useful form. The examples given are merely illustrative and are not to be construed as limiting this invention.

*Example I*

A fermentation medium containing the following proportions of ingredients was prepared:

| | Parts by weight |
|---|---|
| Soybean meal | 30.0 |
| Corn starch | 5.0 |
| Corn steep liquor | 3.0 |
| Sodium nitrate | 3.0 |

This material was made up with distilled water to provide 41 grams per liter, and the mixture was adjusted to pH 7.0 with potassium hydroxide solution. To the mixture were added per liter 5.0 grams of calcium carbonate and 7.5 ml. of soybean oil. Two thousand milliliter portions of this medium were then added to fermentation vessels, equipped with stirrers and aeration spargers, and sterilized at 121° C. for 60 minutes. After cooling the flasks were inoculated with a suspension of our new strain No. ATCC 11924 of *S. lavendulae*, obtained from the surface of agar slants. The flasks were stirred for four days at 28° C. at approximately 1700 R. P. M. At the end of this period the broth was found to contain cyclosterine in the amount of about 250 C. D. U./ml. of broth. The mycelium was separated from the broth by filtration. The broth had a pH of about 7.5. Tests showed it to be highly active against a variety of microorganisms.

*Example II*

One liter of cycloserine fermentation broth obtained as in Example I was adjusted to pH 10 with dilute sodium hydroxide and stirred with 10 grams of activated carbon for 30 minutes. The carbon was removed with a diatomaceous earth filteraid and the fermentation broth was adjusted to pH 2 with dilute sulfuric acid. A further portion of activated carbon was added to the broth, the mixture was stirred for 30 minutes, and the activated carbon was again removed by filtration and washed with a small volume of water. There was little loss in cycloserine activity and the solution obtained was practically colorless. The partially purified acid solution of cycloserine was then adsorbed on a column of "Amberlite IR 120" in the hydrogen cycle. The column was washed with a small volume of water and then the antibiotic was eluted fractionally by means of a solution containing one milliliter of concentrated ammonium hydroxide per 100 milliliters of solution. Little activity was removed from the column until the effluent reached a pH of 6.1. The fraction obtained with the effluent at a pH of 6.1 to 6.4 was recovered and dried from the frozen state. The product consisted of a fine, pale pink powder having a cycloserine activity of 200 C. D. U./mg. It was most suitable for use in therapy because of its low toxicity and considerable antibiotic activity.

A portion of this concentrate was dissolved in a small volume of 50% methanol and applied to a column of activated alumina which had been washed with 50% aqueous methanol. Further 50% methanol was passed through the column to develop and purify the antibiotic fractions. As the solution passed out of the column, it was divided into a number of fractions of equal volume. By removing the methanol under vacuum and drying from the frozen state, material of high cycloserine potency and having substantially no color was obtained.

*Example III*

Fermentation broth prepared by growing *Streptomyces lavendulae* ATCC 11924 in a nutrient medium was found to have a pH of 7–8. Sulfuric acid was added to the whole fermentation broth with stirring and, when a pH of 2 was reached, the mycelium was filtered. Activated carbon was added to the filtrate at a concentration of about 2 percent. After stirring at room temperature for half an hour, the carbon was removed and between 10 and 15 percent of the biological activity of the solution was lost, but considerable impurities and colored materials were removed. The antibiotic was adsorbed on "Amberlite IR 120" ion-exchange resin by passing the solution through a column of this material. The column was washed with a small volume of water and the product was eluted with dilute ammonium hydroxide. The red solution which was obtained from the column was partially concentrated under vacuum at room temperature or slightly lower and the concentrate was frozen and dried under vacuum. The dry product was extracted several times with methanol. The methanol extracts were filtered and five volumes of acetone were added to the filtrate. The precipitated impurities were removed by filtration and the solution was concentrated to about $\frac{1}{30}$ to $\frac{1}{40}$ volume. Certain impurities separated during this concentration. These were filtered and the filtrate was again concentrated to about $\frac{1}{10}$ its volume. A crude, crystalline antibiotic product separated during this concentration. This material is tan or reddish in color.

The crude, crystalline product obtained by the procedure described above may be used for certain therapeutic purposes. However, it may be preferred to purify the material further. This may be accomplished by recrystallization from hot methanol. Activated carbon and a filteraid, such as, Super Filtrol, may be used to remove the various colored impurities which adhere to the product. On cooling the filtered methanol solution, white crystals slowly separated. A further crop of material was obtained by concentration and cooling. Alternatively the crude, crystalline antibiotic cycloserine is dissolved in the minimum volume of water (about a 25 percent solution). Ethanol is then slowly added to the concentrated solution. The crystalline antibiotic separates during this process.

The present application is a continuation-in-part of our copending application Serial No. 216,254, filed March 17, 1951, and now abandoned.

As many apparently widely different embodiments of this invention may be made without departing from the spirit and scope hereof, it is to be understood that the above invention is not limited, except as defined in the appended claims.

What is claimed is:

1. A process for producing cycloserine which comprises cultivating strain No. ATCC 11924 of *Streptomyces lavendulae* in an aqueous, nutrient-containing solution under submerged aerobic conditions until substantial antibiotic activity is imparted to said solution.

2. A process for producing cycloserine which comprises cultivating strain No. ATCC 11924 of *Streptomyces lavendulae* in an aqueous, nutrient-containing carbohydrate solution under submerged aerobic conditions until substantial antibiotic activity is imparted to said solution, and then recovering the so-produced cycloserine from the fermentation broth.

3. A process for producing cycloserine which comprises cultivating strain No. ATCC 11924 of *Streptomyces lavendulae* in an aqueous, nutrient-containing carbohydrate solution under submerged aerobic conditions at a temperature of from about 25° to about 30° C. for a period of from about two days to about four days and then recovering the so-produced cycloserine from the fermentation broth.

4. A process as claimed in claim 2 wherein the recovery of cycloserine includes the step of adsorbing the antibiotic on an ion-exchange resin containing sulfonic acid groups.

5. Cycloserine, an amphoteric substance effective in inhibiting the growth of mycobacteria, which is highly soluble in water and slightly soluble in methanol and which contains the elements carbon, hydrogen, nitrogen, and oxygen in the following proportions:

| | Percent |
|---|---|
| Carbon | 35.3 |
| Hydrogen | 5.9 |
| Nitrogen | 27.4 |
| Oxygen (by difference) | 31.4 | which has a positive optical rotation in methanol and a suspension of which in mineral oil exhibits characteristic absorption in the infrared region of the spectrum at the following frequencies expressed in reciprocal centimeters: 1626, 1602, 1580, 1557, 1534, 1408, 1402, 1266, 1227, 1168, 1141, 1117, 1064, 938, 916, 892, 880, and 830.

References Cited in the file of this patent

UNITED STATES PATENTS

| 2,442,230 | Foster | June 17, 1947 |
| 2,528,022 | Van Dolah | Oct. 31, 1950 |

OTHER REFERENCES

Morton: Soc. Expt'l. Biol. and Med., vol. 64, pages 327 to 331 (1947).

Kocholaty et al.: 1948, Arch. Biochem., 15. The Use of Cation Exchangers for the Concentration and Purification of Antibiotics of a Basic Nature, pages 55 to 64. QP–501–.A77.

Swart et al.: Arch. Biochem., vol. 24, November 1949, pages 92 to 103.